June 14, 1960 R. GROSSMEYER 2,940,100
COMPOSITE SCOURING AND WIPING DEVICE
Filed July 14, 1958
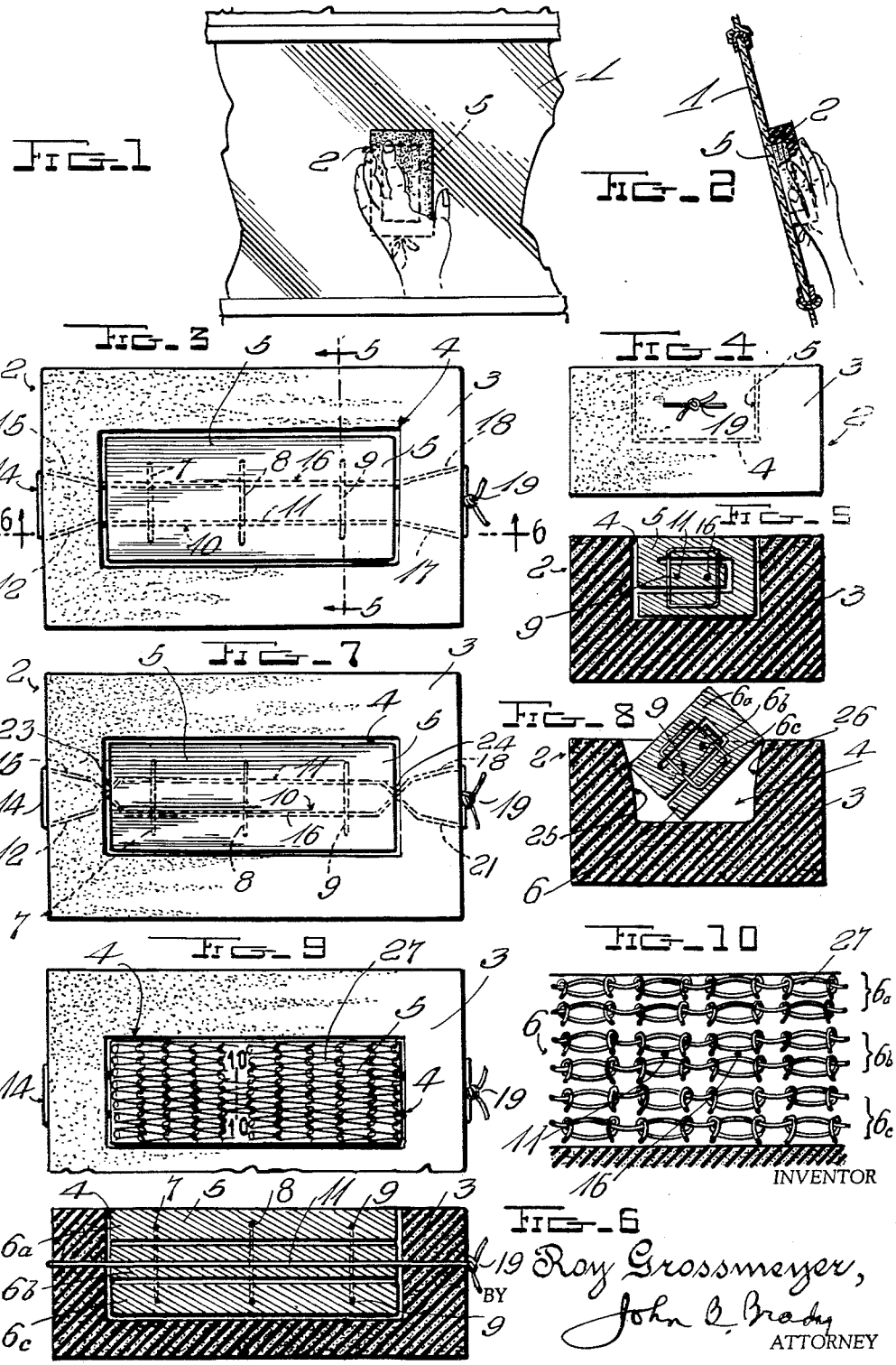
INVENTOR
Roy Grossmeyer,
BY John B. Brady
ATTORNEY

United States Patent Office 2,940,100
Patented June 14, 1960

2,940,100

COMPOSITE SCOURING AND WIPING DEVICE

Roy Grossmeyer, Rte. 1, Box 1, Jefferson, Oreg.

Filed July 14, 1958, Ser. No. 748,389

2 Claims. (Cl. 15—118)

My invention relates broadly to brushing and scrubbing and more particularly to a construction of composite scouring and wiping device.

One of the objects of my invention is to provide a construction of composite scouring and wiping device which may be used on surfaces where it is of prime importance to remove dirt and other accumulations without scratching or impairing the surface.

Another object of my invention is to provide a composite construction of both coarse and fine surface scouring device where one portion of the device serves to scour and remove dirt and other accumulations from the surface while another portion of the device serves to wipe the surface.

Still another object of my invention is to provide a composite construction of scouring and wiping device in which the wiping portion of the device peripherically surrounds the scouring portion of the device and wherein the said scouring portion of the device is reversible in its position with respect to the said wiping portion for increasing the life of the device by presenting either of two scouring surfaces for coaction with the surface of the wiping portion of the device.

A further object of my invention is to provide a construction of scouring and wiping device in which the scouring portion of the device is set within the wiping portion of the device and is formed from an assembly having a texture which is coarse with respect to the texture of the wiping portion of the device and wherein the wiping portion of the device is sufficiently yieldable to enable the scouring portion of the device to be reversed in position to present a surface of coarse texture coplanar with a surface of fine texture constituted by the wiping portion of the device whereby the scouring portion and the wiping portion of the device coact for effectively removing dirt and other accumulated matter and wiping the surface from which said matter is removed.

Other and further objects of my invention reside in the construction of a scouring and wiping device formed from a composite plastic textile assembly and sponge rubber assembly as set forth more fully in the specification hereinafter following by reference to the accompanying drawings in which:

Fig. 1 is a fragmentary pictorial illustration illustrating the application of the composite scouring and wiping device of my invention in the cleaning of an automobile windshield, the view being shown in elevation;

Fig. 2 is a vertical sectional view illustrating the application of the device of my invention as shown in Fig. 1, the view showing the device partially broken away and illustrated in section in order to indicate the diversified structure of the scouring and wiping portions of the device;

Fig. 3 is a plan view looking at the bottom of the device of my invention and showing the central scouring portion of the device mounted within the wiping portion of the device and subject to a reversal in position;

Fig. 4 is an end view of the device shown in Fig. 3;

Fig. 5 is a transverse sectional view taken on line 5—5 of Fig. 3;

Fig. 6 is a longitudinal sectional view taken substantially along line 6—6 of Fig. 3;

Fig. 7 is a plan view looking at the underside of the device similar to the view illustrated in Fig. 3 but showing the scouring portion of the device illustrated in reverse position for presenting a fresh surface of the scouring portion of the device to the surface to be cleaned;

Fig. 8 is a view illustrating the manner in which the central scouring portion of the device is reversed with respect to the peripheral wiping portion of the device;

Fig. 9 is a fragmentary plan view looking at the bottom surface of the device and illustrating the plastic texture of the scouring portion of the device; and Fig. 10 is a view drawn upon an enlarged scale transversely along line 10—10 of Fig. 9 and illustrating the several layers of the coarse plastic textile material employed in making the scouring portion of the device.

My invention is directed to a scouring and wiping device which has both a relatively smooth wiping area and a coarse scouring area where the coarse scouring area is reversibly supported within the confines of the wiping area so that a fresh scouring surface may be presented for surface treatment when the scouring area has become excessively blocked or caked with grease, dirt or other accumulations. The wiping area is constituted by a sponge or foam rubber surface while the coarse scouring area is formed from plastic strands woven or knit in a self-sustaining manner and terminating substantially coplanar with the wiping surface. By reason of the composite arrangement of the coarse and fine polishing surfaces, the surface to be treated may be readily cleaned by a scouring action effected by the coarse scouring surface and wiped simultaneously by the relatively smooth wiping surface.

Referring to the drawings in more detail, reference character 1 designates a glass surface, such as an automobile windshield, to be cleaned. The composite scouring and wiping device of my invention is represented at 2, shaped as a parallelepiped or rectangular bar or flexible shell which may be readily grasped in the hand and moved over the surface to be cleaned. The rectangular bar 2 is formed from soft sponge or foam rubber represented at 3 which is recessed at 4 for receiving the reversible insert or scouring unit of coarse or scouring material indicated at 5. The foam rubber bar 3 represents a marginal surface portion extending around the insert 5 and terminating in a flat wiping surface. The insert 5 is located centrally within the recess 4 in the foam or sponge rubber block 3 and is reversible in its position as indicated more clearly in Fig. 8 to present either of two of the surfaces thereof in a position coplanar with the marginal surface of the sponge or foam rubber bar 3. This insert 5 is formed from a knitted or woven plastic sheet 6 represented more clearly in Figs. 9 and 10. This plastic sheet 6 is formed from coarse plastic threads which are woven or knitted and present a relatively rough scouring surface centrally of the foam or sponge rubber surface 3. The plastic sheet 6 after being woven or knitted is wrapped upon itself to form a substantially rectangular block as represented more clearly in Figs. 5, 6 and 8. That is to say the plastic sheet 6 when being wrapped upon itself is built up in the form of a block in three layers represented at 6a, 6b and 6c wrapped in superimposed relation and secured firmly together by means of threads 7, 8 and 9 which are passed through substantially the centers of the layers 6b and 6c and extend through the layer 6a for binding the layers together in such way that the threads 7, 8 and 9 are not exposed but are embedded within the insert 5. These laterally extending fastening threads 7, 8 and 9 extend around and in spaced relation to the paths 11 and 16 of the cord or thread 10 as will be hereinafter explained.

A flexible cord or a thread 10 extends longitudinally through the block or insert 5 passing in spaced parallel paths on either side of the center of the insert 5. The flexible cord or thread 10 extends through the insert 5 in a position displaced from the center line thereof as shown at 11, in Figs. 3 and 7 and extends outwardly along an angularly directed path 12 through the end wall of block 2 where it is looped as represented at 14 and extends along the outside of the end wall of the block 2 beyond the center line of the block 2 where it is then passed through the block 2 along an inclined path 15 from which it passes out of the sponge or foam rubber material of block 2 and into the coarse material of the insert 5 along a longitudinally extending path 16. The two ends of the cord or thread extend outwardly from the end of insert 5 as shown in Fig. 3 and then pass on outwardly inclined tapered paths through the material of the foam or sponge rubber block 2 in the directions indicated at 17 and 18. The free ends of the cord or thread 10 extend beyond the end of the foam or sponge rubber block 2 and are tied in a fastening knot as represented at 19 on the outside of the foam or sponge rubber block 2.

The composite scouring and wiping device thus formed is thus assembled for operation and may be moved over the surface to be cleaned as represented in Figs. 1 and 2, whereupon the coarse material of the insert 5 serves to scrape accumulations of dirt, grease, or other foreign matter from the surface while the wiping surface 3 of the block 2 wipes the surface thus cleaned. When the coarse surface of the insert 5 has accumulated excessive dirt or foreign matter the insert 5 is reversed in position as represented in Fig. 8. This reversal operation simply involves the crossing of the threads or cords 11 and 16 intermediate the ends of the insert 5 and the interior of the end walls at 20 and 21 of the block 2 as represented at 23 and 24. The sponge or foam rubber of block 2 is sufficiently pliable to permit the insert 5, during its reversal, to distort the interior surfaces of the side walls of the recess 4 in the bar or block 2, as represented at 25 and 26 in Fig. 8.

In Figs. 9 and 10 I have shown more clearly the structure of the insert 5 where the knitted or woven plastic threads of the plastic sheet 6 each serves as a very effective scraping means for scouring the surface to which the device is applied. For example in Fig. 10 the loops 27 of the outside layer 6a of the plastic sheet 6 serve as individual scrapers against the surface over which the device is rubbed. As heretofore noted, when these scraping elements 27 become clogged with an accumulation of dirt or grease, or other foreign matter, the entire insert 5 is reversed in position as represented in Fig. 8, thus extending the operating life of the device.

The composite scouring and wiping device may be manufactured so inexpensively that after being used as a scourer with one surface of the insert 5 exposed for scouring purposes and after being reversed to fill up the opposite scouring surface the device may be thrown away.

I have illustrated the bar or rectangular block 2 as having a recess 4 for the insert 5 therein but it will be understood that the bars or blocks may be mass produced by a cutting operation where the recess extends entirely through the central portion of the block and is subsequently closed or filled by an insert conforming with the recess where such insert has a depth sufficient to allow the mounting of the insert 5 and the reversal of the insert when necessary.

While I have described my invention in certain preferred embodiments I realize that modifications may be made and I desire that it be understood that no limitations upon my invention are intended other than may be imposed by the scope of the appended claims.

What I claim as new and desire to secure by Letters Patent of the United States is as follows:

1. A composite wiping and scouring device comprising a flexible shell of wiping material substantially in the shape of a parallelepiped having a correspondingly shaped hollow recess in one face thereof, an insert consisting of a substantially flat layer of scouring material folded upon itself to form a central layer and top and bottom layers on opposite sides thereof constituting a scouring unit, laterally disposed threads extending through said folded layers of scouring material forming loops within said folded layers for maintaining said folded layers in an assembly constituting said scouring unit, said scouring unit substantially filling said recess, a flexible cord free-ended at one end with the other end thereof extending through one end wall of said flexible shell and having a portion thereof extending into and longitudinally through the said scouring unit within the loops therein and passing through the opposite end wall of said flexible shell and looped around the exterior of the end thereof and returning through the wall of said shell and into and through said scouring unit within the loops therein and laterally spaced in substantially parallel relation to the aforesaid longitudinally extending portion of said cord, said cord passing out of said scouring unit and through the first mentioned end wall of said flexible shell to the exterior thereof terminating in a free end, both of the free ends of said cord being interconnected externally of the last mentioned end of said flexible shell, said cord including sufficient slack and said shell being sufficiently yieldable to enable said scouring unit to be reversed in position within the hollow recess within said flexible shell for presenting either of two opposite faces of said scouring unit, while said unit is confined to said flexible shell, coplanar with the plane of the wiping material of said flexible shell.

2. A composite wiping and scouring device as set forth in claim 1 in which said cord passes through the end walls of said flexible shell in paths which are tapered inwardly from the exterior of the end walls of said shell toward the ends of said scouring unit and wherein the spaced portions of said cord extending through said scouring unit are substantially parallel between the inwardly tapered paths of said cord extending to the interior faces of the end walls of said flexible shell, said cord being free to cross at each end of said scouring unit when said scouring unit is reversed in the recess in said shell.

References Cited in the file of this patent

UNITED STATES PATENTS

| | | |
|---|---|---|
| 219,324 | Sunderlin | Sept. 2, 1879 |
| 824,013 | Harrison | June 19, 1906 |
| 1,816,529 | Hertzberg | July 28, 1931 |
| 2,066,420 | Reysa | Jan. 5, 1937 |
| 2,113,452 | Long | Apr. 5, 1938 |
| 2,601,771 | Cameron | July 1, 1952 |